V. N. LUNDSTROM.
DRAFT APPLIANCE.
APPLICATION FILED JULY 14, 1919.
1,327,871.
Patented Jan. 13, 1920.
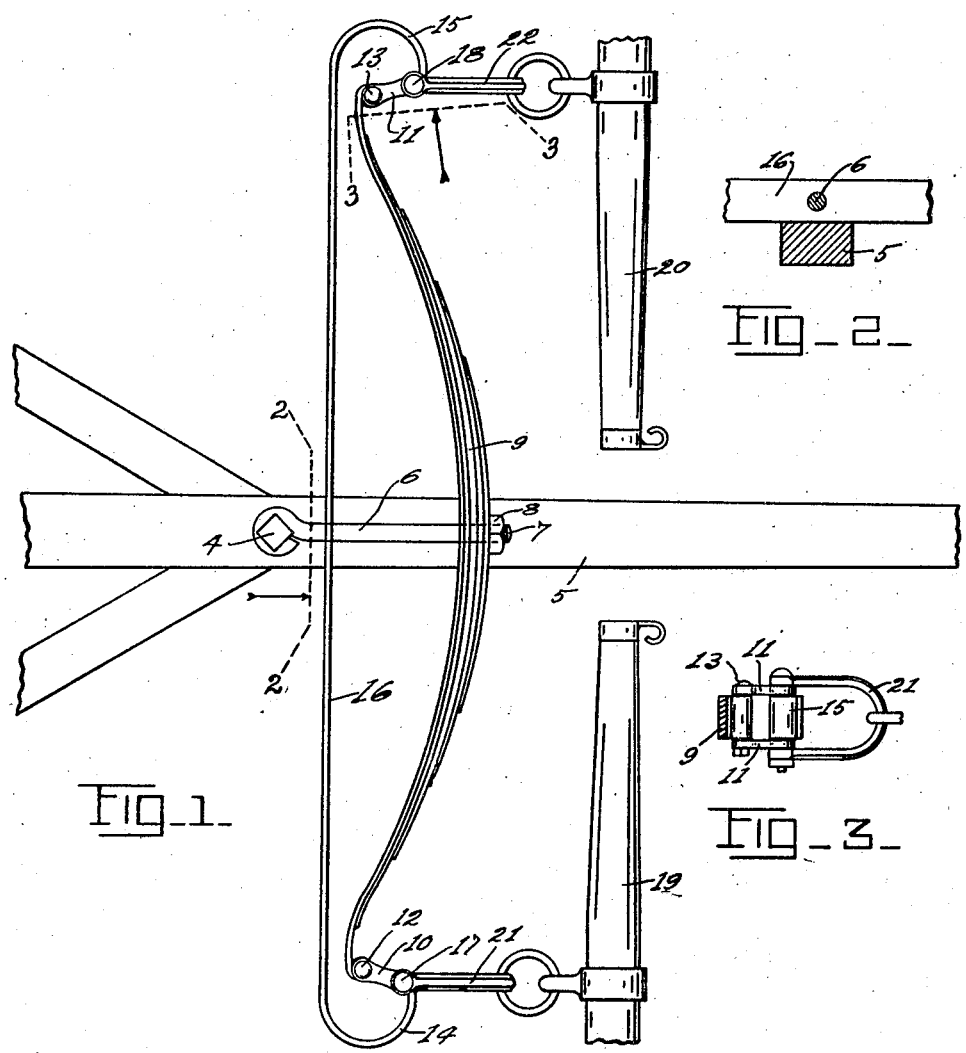
Inventor
V.N. LUNDSTROM.
By A. E. Carlsen.
Attorney

UNITED STATES PATENT OFFICE.

VICTOR NATANIEL LUNDSTROM, OF CLARISSA, MINNESOTA.

DRAFT APPLIANCE.

1,327,871.  Specification of Letters Patent.  Patented Jan. 13, 1920.

Application filed July 14, 1919. Serial No. 310,853.

*To all whom it may concern:*

Be it known that I, VICTOR NATANIEL LUNDSTROM, a citizen of the United States, residing at Clarissa, in the county of Todd and State of Minnesota, have invented certain new and useful Improvements in Draft Appliances, of which the following is a specification.

My invention relates to draft appliances and the object is to provide a double tree of such construction that it will offer a yielding resistance between a vehicle or drawn implement and the horses drawing the same. The device is clearly shown in the accompanying drawing, in which:

Figure 1 is a top or plan view of the device as applied to the tongue of a vehicle or implement to be drawn. Fig. 2 is a sectional detail view on the line 2—2 in Fig. 1. Fig. 3 is a sectional detail view on the line 3—3 in Fig. 1.

Referring to the drawing by reference numerals, 4 designates the king bolt secured in the shaft 5 of the vehicle to be drawn. An eye bolt 6, having its eye engaged by said bolt 4, has its threaded end 7 secured by a nut 8 to the middle point of a leaf spring 9. Said leaf spring 9 is pivotally secured at its ends to two sets of links 10 and 11, by bolts 12 and 13 respectively. The other ends of the links 10 and 11 pivotally engage the curved extensions 14 and 15 of a cross bar 16, by bolts 17 and 18. Said cross bar is slidably mounted at its middle upon the eye bolt 6 and has for its purpose to help keep the pivot point of the double tree away from the center part of the spring and to the king-bolt 4 where the pivot should be. It also gives steadiness to the device. Swingletrees 19 and 20 are secured to two clevises 21 and 22 which are also pivotally mounted upon the bolts 17 and 18 respectively.

The spring 9 is made stiff enough so that it remains practically rigid under normal conditions. But when heavy loads are being drawn over rough roads, or when the device is being used on a plow when plowing on rocky land, the spring yields to the extent that the sudden shocks, otherwise imparted to and taken up by the horses, is eliminated.

Having now fully shown and described my invention what I claim to be new and desire to protect by Letters Patent is:

A double tree consisting of a leaf spring, an eye bolt fixed to the middle portion of the spring and adapted to be secured to a vehicle to be drawn, a cross bar slidably mounted upon said eye bolt and having forwardly curved extensions at its ends, link connections between the ends of the leafspring and the respective end extensions of the cross bar, clevises pivotally mounted upon said cross bar extensions.

In testimony whereof I affix my signature.

VICTOR NATANIEL LUNDSTROM.